(12) United States Patent
Kuo

(10) Patent No.: US 9,482,832 B2
(45) Date of Patent: Nov. 1, 2016

(54) OPTICAL COUPLING COMPONENT WITH METAL POSITIONING RODS AND OPTICAL-ELECTRICAL CONVERTING MODULE HAVING SAME

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 29 days.

(21) Appl. No.: 14/093,696

(22) Filed: Dec. 2, 2013

(65) Prior Publication Data

US 2015/0049986 A1   Feb. 19, 2015

(30) Foreign Application Priority Data

Aug. 16, 2013  (TW) ............................. 102129595 A

(51) Int. Cl.
| | |
|---|---|
| *G02B 6/42* | (2006.01) |
| *G02B 6/26* | (2006.01) |
| *G02B 6/43* | (2006.01) |
| *G02B 6/38* | (2006.01) |

(52) U.S. Cl.
CPC .............. *G02B 6/4292* (2013.01); *G02B 6/425* (2013.01); *G02B 6/26* (2013.01); *G02B 6/3885* (2013.01); *G02B 6/4204* (2013.01); *G02B 6/4231* (2013.01); *G02B 6/43* (2013.01)

(58) Field of Classification Search
CPC ........ G02B 6/4204; G02B 6/42; G02B 6/43; G02B 6/26; G02B 6/4231; G02B 13/0035; G02B 13/004; G02B 13/0045; G02B 6/4257; G02B 6/0005; G02B 6/3882; G02B 6/3883; G02B 6/4219
USPC ....................................... 385/33–35
See application file for complete search history.

(56) References Cited

U.S. PATENT DOCUMENTS

| | | | | |
|---|---|---|---|---|
| 7,421,160 B1* | 9/2008 | Budd | ........................ | G02B 6/30 |
| | | | | 385/129 |
| 2002/0064347 A1* | 5/2002 | Mertz | ................... | G02B 6/4292 |
| | | | | 385/52 |
| 2003/0113077 A1* | 6/2003 | Xu | ........................ | G02B 6/4204 |
| | | | | 385/93 |
| 2006/0164738 A1* | 7/2006 | Yamamoto | ........... | G02B 6/3829 |
| | | | | 359/871 |
| 2012/0155803 A1* | 6/2012 | Benjamin | ............ | G02B 6/3886 |
| | | | | 385/33 |
| 2013/0202255 A1* | 8/2013 | Togami | ................... | G02B 6/421 |
| | | | | 385/79 |

* cited by examiner

*Primary Examiner* — Thomas A Hollweg
*Assistant Examiner* — Mary A El Shammaa
(74) *Attorney, Agent, or Firm* — Zhigang Ma

(57) ABSTRACT

An optical coupling component includes a main body, first and second converging lenses, and positioning rods. The main body includes a first optical surface and a second optical surface substantially parallel to the first optical surface, and defines positioning holes adjacent to the second optical surface. The first converging lenses are formed on the first optical surface. The second converging lenses are formed on the second optical surface and correspond to the first converging lenses one-to-one. The positioning rods are made of metal and are received in the positioning holes by interference fit. The positioning rods include connecting ends extending out of the positioning holes.

9 Claims, 5 Drawing Sheets

OPTICAL COUPLING COMPONENT WITH METAL POSITIONING RODS AND OPTICAL-ELECTRICAL CONVERTING MODULE HAVING SAME

BACKGROUND

1. Technical Field

The present disclosure relates to an optical coupling component and an optical-electrical converting module having the optical coupling component.

2. Description of Related Art

An optical-electrical converting module includes an optical coupling component. The optical coupling component includes positioning rods for inserting into holes of an optical fiber connector to connect the optical-electrical converting module to the optical fiber connector. As the optical coupling component is usually made of resin, the positioning rods may be broken after repeat use.

Therefore, it is desirable to provide an optical coupling component and an optical-electrical converting module which can overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
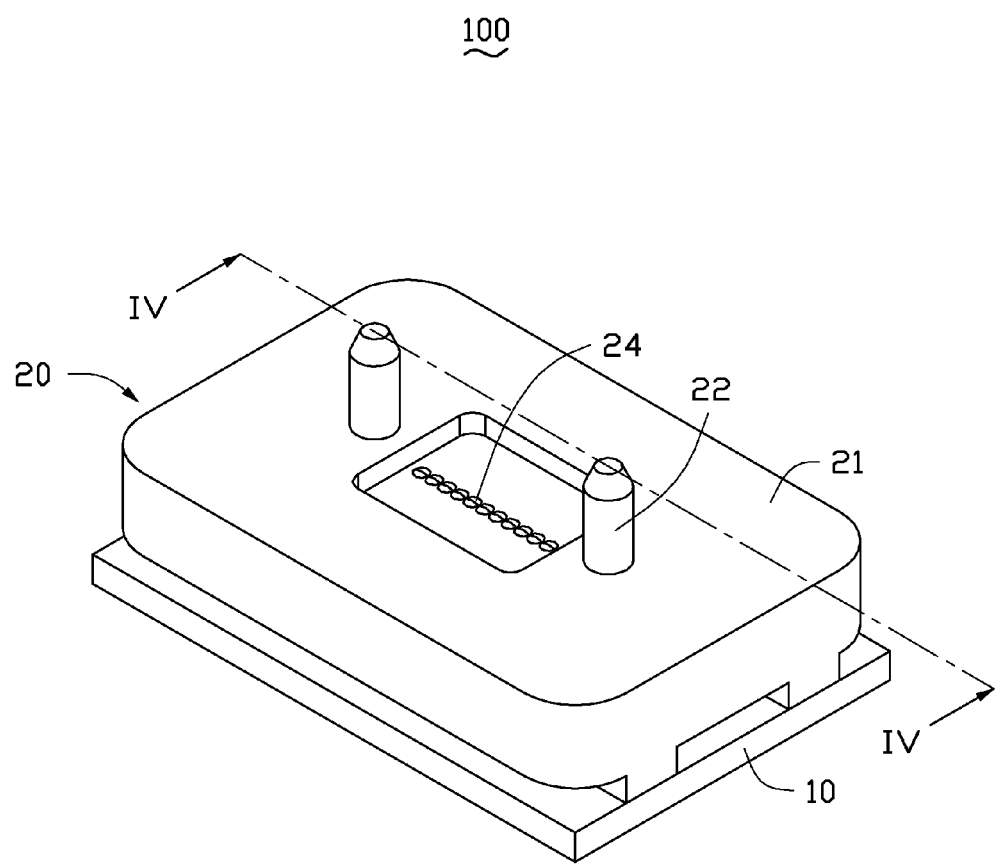
FIG. 1 is a schematic, isometric view of a first embodiment of an optical-electrical converting module.
Figure 2:
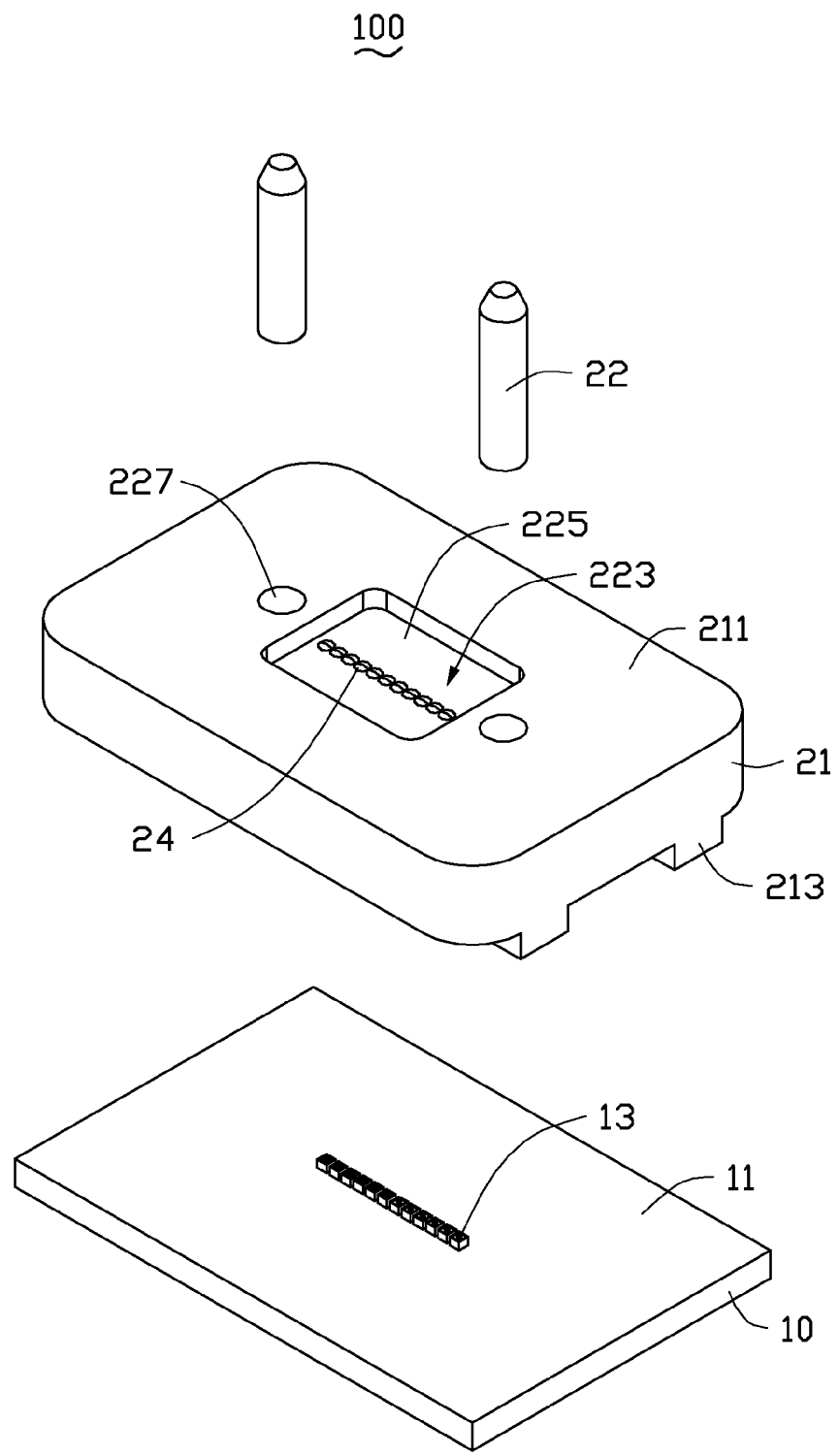
FIG. 2 is an exploded view of the optical-electrical converting module of FIG. 1.
Figure 3:
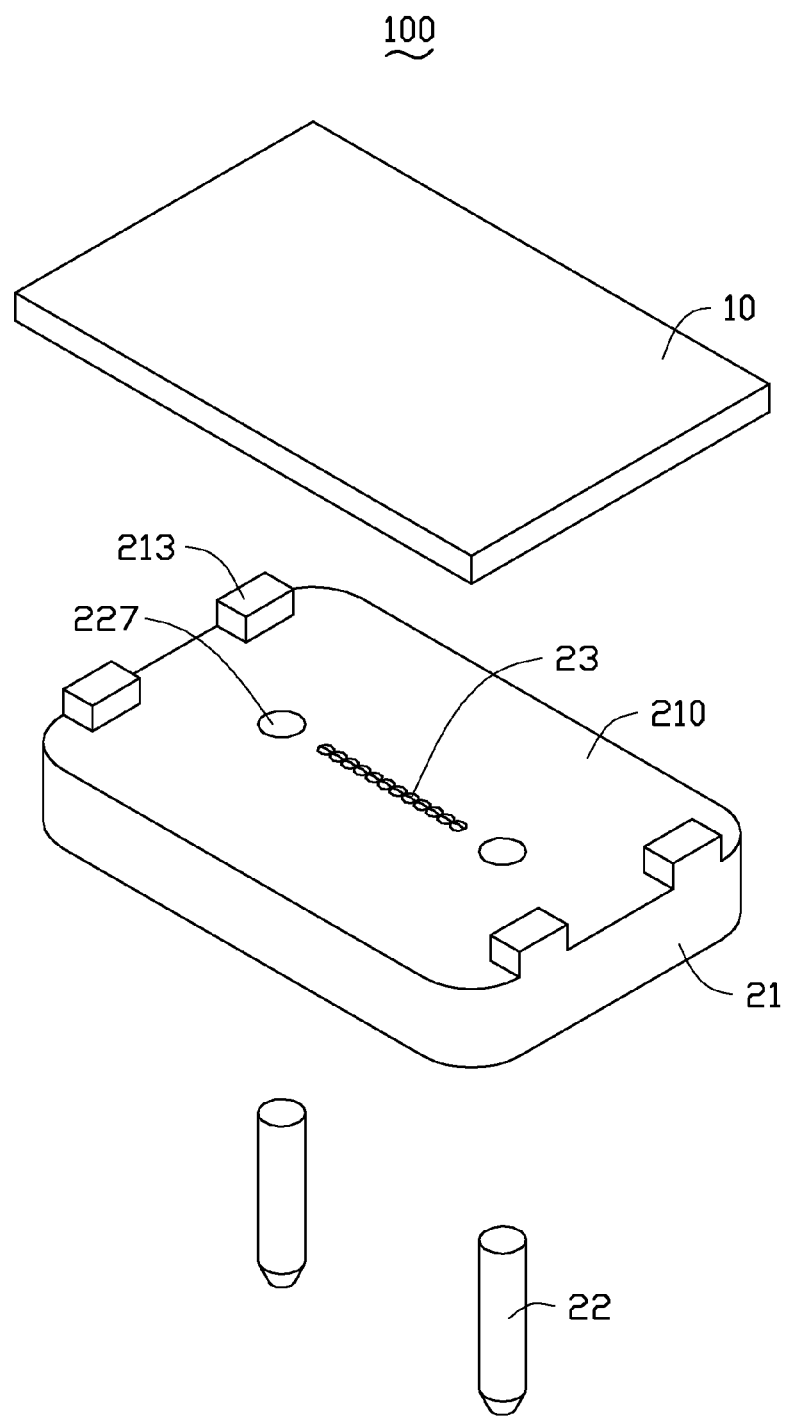
FIG. 3 is similar to FIG. 2, but viewed from another angle.
Figure 4:
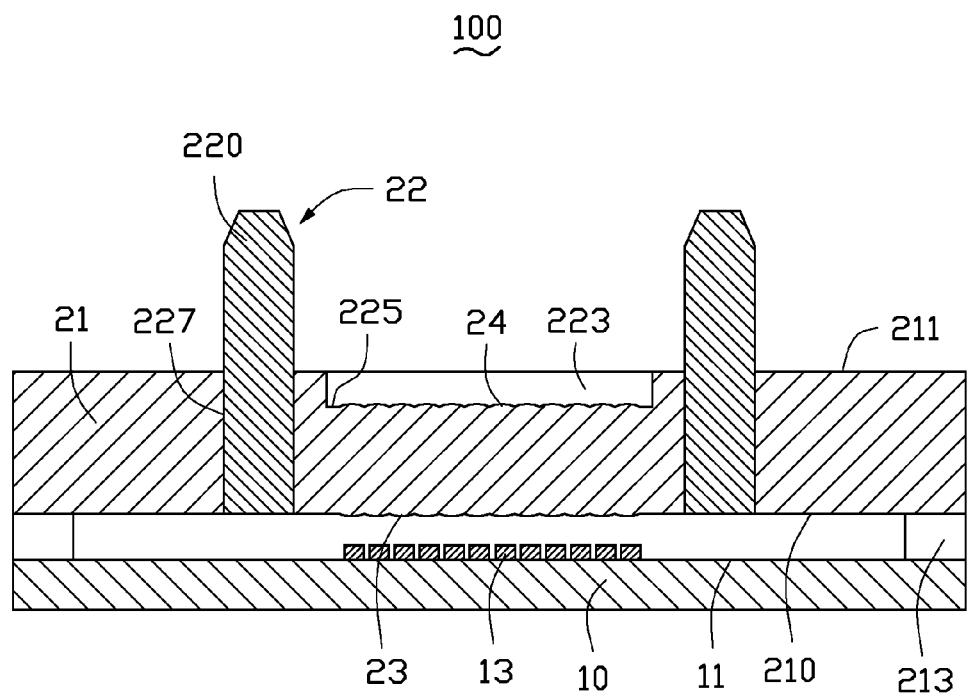
FIG. 4 is a cross-sectional view taken along line IV-IV of FIG. 1.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 1 through 4 show a first embodiment of an optical-electrical converting module 100. The optical-electrical converting module 100 includes a printed circuit board (PCB) 10 and an optical coupling component 20 mounted on the PCB 10.

The PCB 10 includes a mounting surface 11 and a number of optical-electrical converting components 13 mounted on the mounting surface 11. In one embodiment, the optical-electrical converting components 13 are arranged in a line. The optical-electrical converting components 13 can be photodiodes and/or laser diodes.

The optical coupling component 20 includes a main body 21, two positioning rods 22, a number of first converging lenses 23, and a number of second converging lenses 24.

The main body 21 is made of transparent resin. The main body 21 includes a bottom surface 210 facing the mounting surface 11, and a top surface 211 substantially parallel to and opposite from the bottom surface 210. The bottom surface 210 is a first optical surface. Four fixing blocks 213 are formed adjacent to four corners, =of the bottom surface 210, respectively. The fixing blocks 213 are used to mount the optical coupling component 20 on the mounting surface 11 of the PCB 10.

The first converging lenses 23 are formed on the bottom surface 210 and aligned with the optical-electrical components 13 one-to-one.

The top surface 211 defines a top groove 223. The bottom wall of the top groove 223 is a second optical surface 225. The second optical surface 225 is substantially parallel to the top surface 211. The second converging lenses 24 are formed on the second optical surface 225 and correspond to the first converging lenses 23 one-to-one. In one embodiment, the first converging lenses 23 and the second converging lenses 24 are convex lenses.

The top surface 211 defines two positioning holes 227 adjacent to the top groove 223. The two positioning holes 227 extend through the top surface 211 and the bottom surface 210.

The main body 21, the first converging lenses 23, and the second converging lenses 24 are integrally formed by an injection molding method.

The positioning rods 22 are made of metal and are substantially cylindrical. The positioning rods 22 are received in the positioning holes 227 by interference fit. The positioning rods 22 include connecting ends 220 extending out of the positioning holes 227. The connecting ends 220 are configured to connect to an optical fiber connector (not shown).

In assembly, glue is applied on a surface of the fixing blocks 213 to mount the optical coupling component 20 to the PCB 10.

In operation, if the optical-electrical converting components 13 include photodiodes, first optical signals emitted from optical fibers (not shown) enter the optical coupling component 20 from the second converging lenses 24, transmit to the first converging lenses 23, and are converged to the photodiodes by the first converging lenses 23. The photodiodes convert the first optical signals into first electrical signals.

If the optical-electrical converting components 13 include laser diodes, the laser diodes convert second electrical signals into second optical signals. The second electrical signals enter the optical coupling component 20 from the first converging lenses 23, transmit to the second converging lenses 24, and are emitted out of the optical coupling component 20 from the second converging lenses 24.

In this embodiment, the positioning rods 22 are made of metal. Thus, the positioning rods 22 are not easily broken after repeat use.

In other embodiments, shapes and sizes of the optical-electrical converting module 100, the top groove 223, the positioning rods 22, the positioning holes 227, the PCB 10, and the fixing blocks 213 can be changed according to actual needs.

Figure 5:
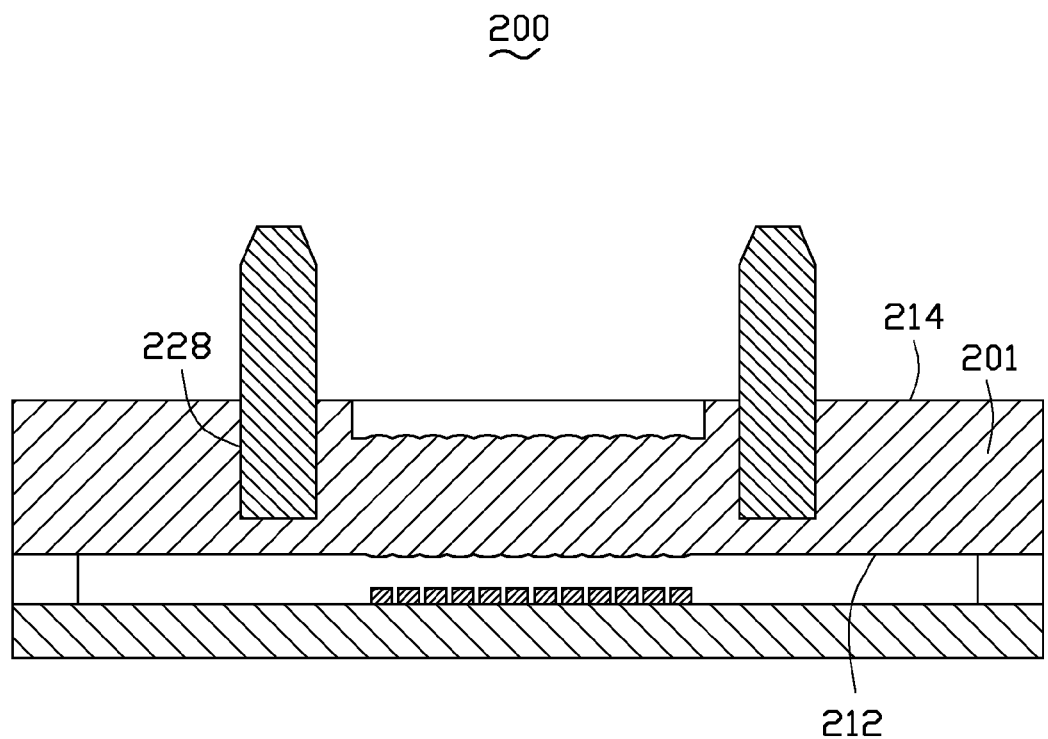
FIG. 5 is a cross-sectional view of a second embodiment of an optical-electrical converting module.

FIG. 5 shows a second embodiment of an optical-electrical converting module 200. The optical-electrical converting module 200 includes an optical coupling component 201. The optical coupling component 201 includes a bottom surface 212 and a top surface 214 opposite from the bottom surface 212. The top surface 214 defines positioning holes 228. The positioning holes 228 are blind holes which do not extend through the bottom surface 212. Other structures of the optical-electrical converting module 200 are substantially similar to structures of the optical-electrical converting module 100.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical coupling component comprising:
    a main body comprising:
        a first optical surface; the first optical surface being a bottom surface of the main body;
        a top surface integrated with the bottom surface and opposite to the bottom surface;
        a top groove defined in the top surface and comprising a bottom wall parallel to the top surface; and
        a second optical surface parallel to the first optical surface, the second optical surface being the bottom wall of the top groove; wherein the top surface defines positioning holes adjacent to the second optical surface;
    a plurality of first converging lenses formed on the first optical surface and arranged in a first straight line that is substantially parallel to the top surface;
    a plurality of second converging lenses formed on the second optical surface and corresponding to the first converging lenses one-to-one arranged in a second straight line that is substantially parallel to the first straight line; and
    positioning rods made of metal and received in the positioning holes by interference fit, the positioning rods comprising connecting ends extending out of the positioning holes.

2. The optical coupling component of claim 1, wherein the main body, the first converging lenses, and the second converging lenses are integrally formed.

3. The optical coupling component of claim 2, wherein the main body, the first converging lenses, and the second converging lenses are made of resin.

4. The optical coupling component of claim 1, wherein the positioning holes extending through the first optical surface.

5. An optical-electrical converting module comprising:
    a printed circuit board (PCB);
    a plurality of optical-electrical converting components mounted on the PCB; and
    an optical coupling component comprising:
        a main body comprising:
            a first optical surface; the first optical surface being a bottom surface of the main body;
            a top surface integrated with the bottom surface and opposite to the bottom surface;
            a top groove defined in the top surface and comprising a bottom wall parallel to the top surface; and
            a second optical surface parallel to the first optical surface, the second optical surface being the bottom wall of the top groove; wherein the top surface defines positioning holes adjacent to the second optical surface;
        a plurality of first converging lenses formed on the first optical surface and corresponding to the optical-electrical components one-to-one arranged in a first straight line that is substantially parallel to the top surface;
        a plurality of second converging lenses formed on the second optical surface and corresponding to the first converging lenses one-to-one arranged in a second straight line that is substantially parallel to the first straight line, wherein the optical-electrical components, the first converging lenses, and the second converging lenses are configured for transmitting optical signals in sequence; and
        positioning rods made of metal and received in the positioning holes by interference fit, the positioning rods comprising connecting ends extending out of the positioning holes.

6. The optical-electrical converting module of claim 5, wherein the main body, the first converging lenses, and the second converging lenses are integrally formed.

7. The optical-electrical converting module of claim 6, wherein the main body, the first converging lenses, and the second converging lenses are made of resin.

8. The optical-electrical converting module of claim 5, wherein the positioning holes extending through the first optical surface.

9. The optical-electrical converting module of claim 5, wherein the main body further comprising fixing blocks formed on the bottom surface and mounted on the PCB.

\* \* \* \* \*